(12) United States Patent
Loc et al.

(10) Patent No.: US 7,293,289 B1
(45) Date of Patent: Nov. 6, 2007

(54) APPARATUS, METHOD AND COMPUTER PROGRAM PRODUCT FOR DETECTION OF A SECURITY BREACH IN A NETWORK

(75) Inventors: Peter Loc, Santa Clara, CA (US); Tyson Leistiko, Sunnyvale, CA (US); Hedley Rainnie, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 803 days.

(21) Appl. No.: 10/242,135

(22) Filed: Sep. 10, 2002

(51) Int. Cl.
*G08B 23/00* (2006.01)

(52) U.S. Cl. .......................................... 726/23; 726/22
(58) Field of Classification Search .................... None
See application file for complete search history.

(56) References Cited

U.S. PATENT DOCUMENTS

| | | | |
|---|---|---|---|
| 6,453,159 B1* | 9/2002 | Lewis ........................ | 455/411 |
| 6,931,128 B2* | 8/2005 | Roberts ...................... | 380/44 |
| 7,032,031 B2* | 4/2006 | Jungck et al. .............. | 709/246 |
| 7,114,008 B2* | 9/2006 | Jungck et al. .............. | 709/246 |
| 2002/0009079 A1* | 1/2002 | Jungck et al. .............. | 370/389 |
| 2002/0022483 A1* | 2/2002 | Thompson et al. ......... | 455/439 |
| 2002/0085719 A1* | 7/2002 | Crosbie ...................... | 380/248 |
| 2003/0065784 A1* | 4/2003 | Herrod ....................... | 709/227 |
| 2003/0217289 A1* | 11/2003 | Ammon et al. ............. | 713/201 |
| 2003/0229809 A1* | 12/2003 | Wexler et al. .............. | 713/201 |
| 2004/0008652 A1* | 1/2004 | Tanzella et al. ............ | 370/338 |
| 2004/0028003 A1* | 2/2004 | Diener et al. ............... | 370/319 |
| 2004/0049699 A1* | 3/2004 | Griffith et al. ............. | 713/201 |
| 2004/0078384 A1* | 4/2004 | Keir et al. .................. | 707/102 |
| 2004/0214572 A1* | 10/2004 | Thompson et al. ......... | 455/435.2 |

OTHER PUBLICATIONS

Jason S. King, "IEEE 802.11 Wireless LAN Security White Paper", published Oct. 22, 2001 http://www.llnl.gov/asci/discom/ucrl-id-147478.html.*
Technology Brief (802.11 Wireless Security in Business Network, Dell Computer Corporation, Feb. 2001) http://www.utdallas.edu/ir/wlans/whitepapers/wireless_security.pdf.*

* cited by examiner

*Primary Examiner*—Gilberto Barrón, Jr.
*Assistant Examiner*—Virgil Herring (57) ABSTRACT

A method, apparatus, and computer-readable media for detecting a security breach in a network comprising an access point and a plurality of transceivers each having a different media access control address comprises, at one of the transceivers, receiving a signal from the access point, the signal representing one or more packets of data; determining a source media access control address for each of the packets; and transmitting an alert packet to the access point when the source media access control address of one of the packets is the media access control address of the transceiver.

49 Claims, 4 Drawing Sheets

---

Client monitors packets on network to determine source MAC address of each packet. —402

Client determines whether any packet not generated by the client has the source MAC address of the client. —404

When such a packet is detected, client sends alert packet to access point. —406

APPARATUS, METHOD AND COMPUTER PROGRAM PRODUCT FOR DETECTION OF A SECURITY BREACH IN A NETWORK

BACKGROUND

The present invention relates generally to data communications. More particularly, the present invention relates to data security in a network.

Recent advances in wireless network technology have made the wireless network an increasingly popular choice to supplement or replace the wired network. But experience has shown that the convenience offered by wireless networks comes with new security risks. Recent studies have shown that current wireless networks are vulnerable to a multitude of attacks such as man-in-the-middle attacks, session hijacking, and parking lot attacks.

SUMMARY

In general, in one aspect, the invention features a method, apparatus, and computer-readable media for detecting a security breach in a network comprising an access point and a plurality of transceivers each having a different media access control address. It comprises, at one of the transceivers, receiving a signal from the access point, the signal representing one or more packets of data; determining a source media access control address for each of the packets; and transmitting an alert packet to the access point when the source media access control address of one of the packets is the media access control address of the transceiver.

Particular implementations can include one or more of the following features. The network is a wireless network. The transceiver encrypts packets using a current key before transmitting the packets to the access point, and before transmitting the alert packet to the access point, the transceiver encrypts a payload portion of the alert packet using a predetermined key other than the current key. The access point recognizes the alert packet as an indication of a security breach in the network on successfully decrypting the alert packet using the predetermined key. The network further comprises an authentication server, and the predetermined key is selected from the group comprising a system key common to the access point and all of the transceivers in the network; a previous key provided by the authentication server to the transceiver before the current key was provided; and an alert key provided to all of the transceivers in the network for the purpose of encrypting the alert packets. The alert packet comprises an unencrypted alert indicator, and the access point recognizes the alert packet as an indication of a security breach in the network by the presence of the unencrypted alert indicator in the alert packet regardless of the key used to encrypt the alert packet. The unencrypted alert indicator is selected from the group comprising a predetermined packet type; and a packet type that generates an error at the access point.

In general, in one aspect, the invention features a method, apparatus, and computer-readable media for detecting a security breach in a wireless network comprising an authentication server, an access point, and a plurality of clients including a client under attack. It comprises decrypting packets sent from the access point to the client under attack using a current key provided by the authentication server; determining whether decrypting was a success or a failure for each of the packets; and after n consecutive failures to decrypt, sending an alert packet to the access point.

Particular implementations can include one or more of the following features. The network is a wireless network. Implementations can comprise encrypting a payload portion of the alert packet before sending using a predetermined key other than the current key. The access point recognizes the alert packet as an indication of a security breach in the wireless network on successfully decrypting the alert packet using the predetermined key. The predetermined key is selected from the group comprising a system key common to the access point and all of the clients in the wireless network; a previous key provided by the authentication server to the client under attack before the current key was provided; and an alert key provided to all of the clients in the wireless network for the purpose of encrypting alert packets. The alert packet comprises an unencrypted alert indicator, and the access point recognizes the alert packet as an indication of a security breach in the wireless network due to the presence of the unencrypted alert indicator in the alert packet regardless of the key used to encrypt the alert packet. The unencrypted alert indicator is selected from the group comprising a predetermined packet type; and a packet type that generates an error at the access point.

In general, in one aspect, the invention features a method, apparatus, and computer-readable media for detecting a security breach in a network comprising a plurality of transceivers each having a different media access control address, the plurality of transceivers including first and second transceivers, the first transceiver acting as a conduit for traffic among the other transceivers. It comprises, at the second transceiver, receiving a signal from the first transceiver, the signal representing packets of data; determining a source media access control address for each of the packets; and transmitting an alert packet to the first transceiver when the source media access control address of one of the packets is the media access control address of the second transceiver.

Particular implementations can include one or more of the following features. The network is a wireless network. The second transceiver encrypts packets using a current key before transmitting the packets to the first transceiver, and implementations can comprise, before transmitting the alert packet to the first transceiver, encrypting a payload portion of the alert packet using a predetermined key other than the current key. The first transceiver recognizes the alert packet as an indication of a security breach in the network on successfully decrypting the alert packet using the predetermined key. The predetermined key is selected from the group comprising a system key common to all of the transceivers in the network; a previous key provided by the first transceiver to the second transceiver before the current key was provided; and an alert key provided by the first transceiver for the purpose of encrypting the alert packets. The alert packet comprises an unencrypted alert indicator, and wherein the first transceiver recognizes the alert packet as an indication of a security breach in the network by the presence of the unencrypted alert indicator in the alert packet regardless of the key used to encrypt the alert packet. The unencrypted alert indicator is selected from the group comprising a predetermined packet type; and a packet type that generates an error at the first transceiver.

In general, in one aspect, the invention features a method, apparatus, and computer-readable media for detecting a security breach in a network comprising a plurality of transceivers including first and second transceivers, the first transceiver acting as a conduit for traffic among the other transceivers. It comprises receiving a signal from the first transceiver, the signal representing one or more packets of data sent to the second transceiver; decrypting the packets using a current key provided by the first transceiver; determining whether decrypting was a success or a failure for each of the packets; and after n consecutive failures to decrypt, transmitting an alert packet to the first transceiver.

Particular implementations can include one or more of the following features. The network is a wireless network. Before transmitting the alert packet to the first transceiver, The second transceiver encrypts a payload portion of the alert packet using a predetermined key other than the current key. The first transceiver recognizes the alert packet as an indication of a security breach in the network on successfully decrypting the alert packet using the predetermined key. The predetermined key is selected from the group comprising a system key common to all of the transceivers in the network; a previous key provided by the first transceiver to the second transceiver before the current key was provided; and an alert key provided by the first transceiver for the purpose of encrypting the alert packets. The alert packet comprises an unencrypted alert indicator, and the first transceiver recognizes the alert packet as an indication of a security breach in the network by the presence of the unencrypted alert indicator in the alert packet regardless of the key used to encrypt the alert packet. The unencrypted alert indicator is selected from the group comprising a predetermined packet type; and a packet type that generates an error at the first transceiver.

In general, in one aspect, the invention features a method, apparatus, and computer-readable media for indicating a security breach in a network comprising an access point and a plurality of transceivers each having a different media access control address, wherein at least one of the transceivers encrypts packets using a current key before transmitting the packets to the access point. It comprises generating an alert packet; encrypting a payload portion of the alert packet using a predetermined key other than the current key; and transmitting the alert packet to the access point; wherein the access point recognizes the alert packet as an indication of a security breach in the network on successfully decrypting the alert packet using the predetermined key.

Particular implementations can include one or more of the following features. The network is a wireless network. The network further comprises an authentication server, and the predetermined key is selected from the group comprising a system key common to the access point and all of the transceivers in the network; a previous key provided by the authentication server to the transceiver before the current key was provided; and an alert key provided to all of the transceivers in the network for the purpose of encrypting the alert packets. The alert packet comprises an unencrypted alert indicator, and wherein the access point recognizes the alert packet as an indication of a security breach in the network by the presence of the unencrypted alert indicator in the alert packet regardless of the key used to encrypt the alert packet. The unencrypted alert indicator is selected from the group comprising a predetermined packet type; and a packet type that generates an error at the access point.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "packet" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Figure 1:
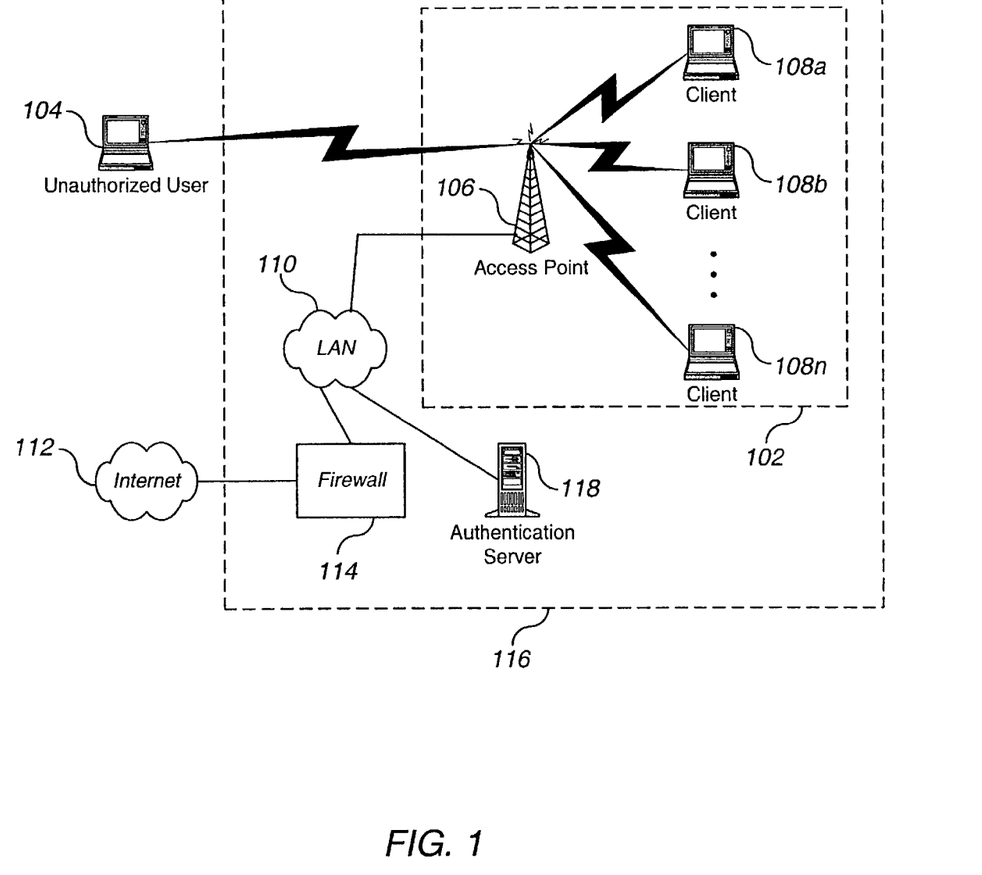
FIG. 1 shows a wireless network under attack by an unauthorized user

FIG. 1 shows a wireless network 102 under attack by an unauthorized user 104. While embodiments of the present invention are described in terms of a wireless network, the present invention is applicable to wired networks as well, as will be apparent to one skilled in the relevant art after reading this description. Wireless network 102 includes an access point 106 that communicates wirelessly with a plurality of transceivers such as clients 108a, 108b through 108n using keys provided by an authentications server 118 such as a remote authentication dial-in user service (RADIUS) server. Each of clients 108 comprises a transmitter, receiver, and processor, as is well-known in the relevant arts. Access point 106 communicates by wire with a wired local area network (LAN) 110. LAN 110 is connected with the Internet 112 through a firewall 114. Access point 106, clients 108, LAN 110, firewall 114, and authentication server 118 are generally located within a security perimeter 116 such as secured building, one or more secured buildings connected by a wired virtual private network, and the like.

The signals on wired LAN 110 remain within security perimeter 116, and are therefore difficult to attack. However, the signals on wireless network 102 traverse security perimeter 116, and so are available to unauthorized user 104, who may simply employ a portable computer within radio range of the network to attack the wireless network. To protect such wireless networks, new techniques have been developed, such as those documented in IEEE standard 802.1x. But even these techniques have been found lacking, and new methods of attack have proven successful.

Figure 2:
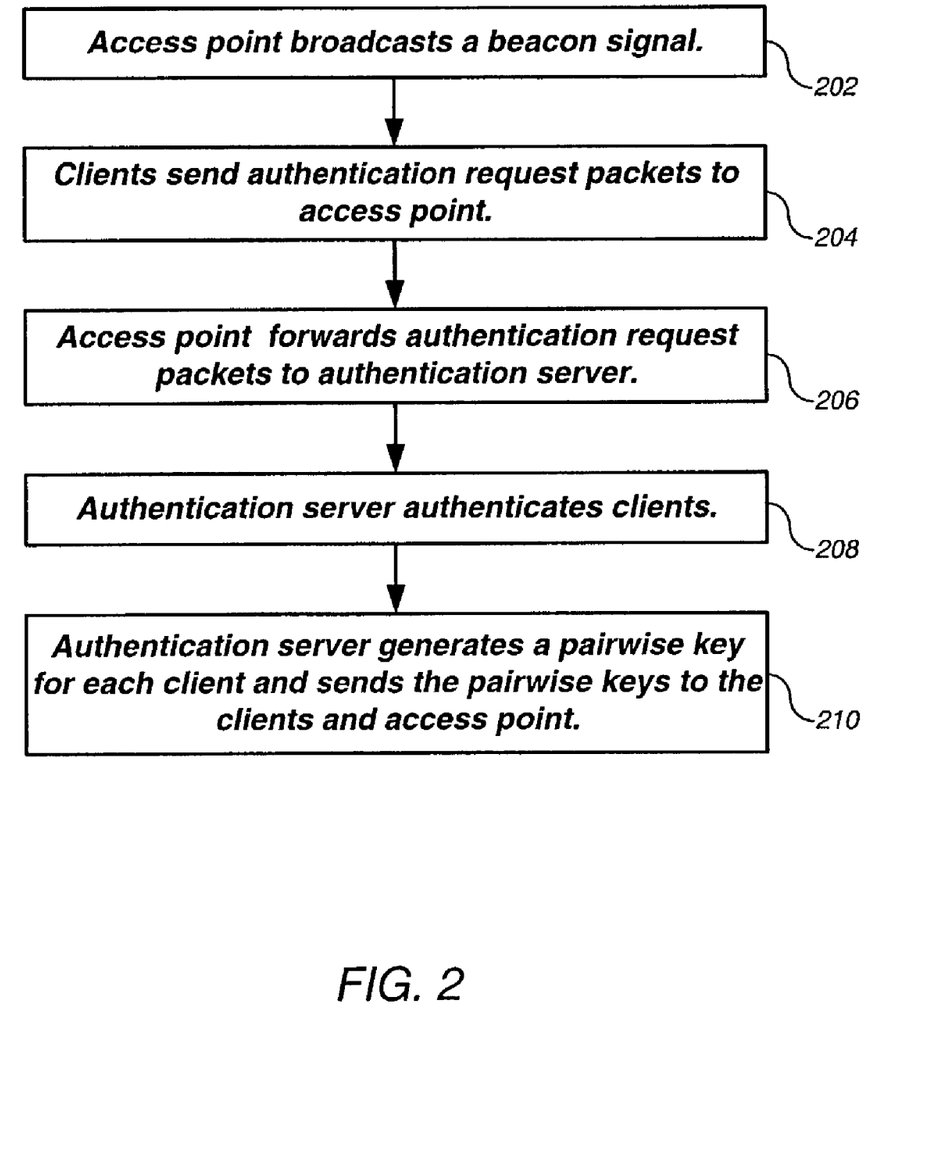
FIG. 2 shows such an initialization procedure for a wireless network.

Before describing a security breach of wireless network 102, and the detection of the security breach, an initialization procedure is described. FIG. 2 shows such a procedure. Access point 106 broadcasts a beacon signal (step 202). In response, each client 108 sends an authentication request packet to access point 106 (step 204). Access point 106 forwards the authentication request packets to authentication server 118 (step 206). Authentication server 118 attempts to authenticate each client 108 by comparing the media access control (MAC) address in the authentication request packet sent by the client to a list of valid client MAC addresses (step 208). On a successful authentication, authentication server 118 generates a pairwise key for each client 108, and sends a packet containing the pairwise key to client 108 and access point 106 (step 210). The packet containing the pairwise key is generally encrypted using a system key established during installation of wireless network 102, or using some other mechanism, such as the advanced encryption scheme (AES). In the described embodiment the pairwise key is a single key that is used for both encryption and decryption of packets exchanged between a client 108 and access point 106. In other embodiments the pairwise key comprises two keys: one for encryption and another for decryption. Other key arrangements are contemplated as well.

Figure 3:
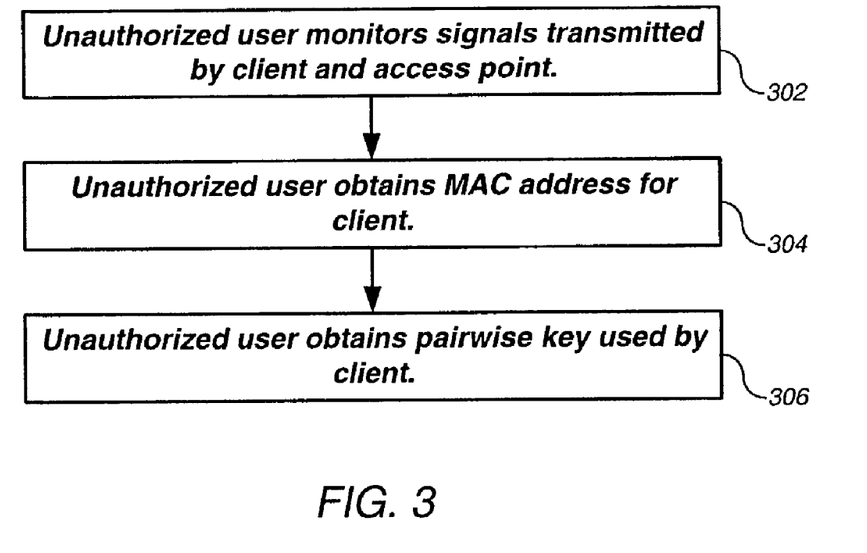
FIG. 3 shows an attack where an unauthorized user spoofs a client in the wireless network.

FIG. 3 shows an attack where unauthorized user 104 spoofs one of clients 108 (that is, the unauthorized user sends messages that appear to come from the client)." Unauthorized user 104 monitors the signals transmitted by client 108 and access point 106 (step 302). Unauthorized user 104 easily obtains the MAC address for client 108 because it is transmitted in the clear (that is, unencrypted) (step 304). Eventually, unauthorized user 104 obtains the pairwise key used by client 108 (step 306), either by breaking the key based an a large number of packets encrypted therewith, or by detecting a new pairwise key when transferred from access point 106 to client 108.

Unauthorized user 104 can now eavesdrop on the packet traffic between client 108 and access point 106 by decrypting those packets using the pairwise key. However, it is impossible to detect this eavesdropping until unauthorized user 104 transmits to wireless network 102. In general, unauthorized user 104 attempts to spoof client 108 by generating a packet containing the MAC address of client 108 as the source MAC address, encrypting the packet using the pairwise key belonging to client 108, and transmitting the encrypted packet to access point 106. Access point 106 cannot distinguish the packets of client 108 from those generated by unauthorized user 104.

One problem with conventional systems is that such an attack generally goes undetected for a significant amount of time. Even when detected, the attack may go unreported even longer. For example, if unauthorized user 104 successfully spoofs a client 108, and then requests a new key, client 108 will be denied service by the access point. Therefore client 108 cannot report the problem over wireless network 102, so the user must report the problem by other means, such as by calling the system administrator. Further, a user may assume the problem is temporary, and wait a while for it to fix itself. In the interval between security breach and corrective action, unauthorized user 104 can do significant damage.

The inventors have recognized that, while it may be impossible to prevent all such attacks, it is possible to quickly and automatically detect an attack, so that the attack can be terminated before the unauthorized user causes any significant damage.

Figure 4:
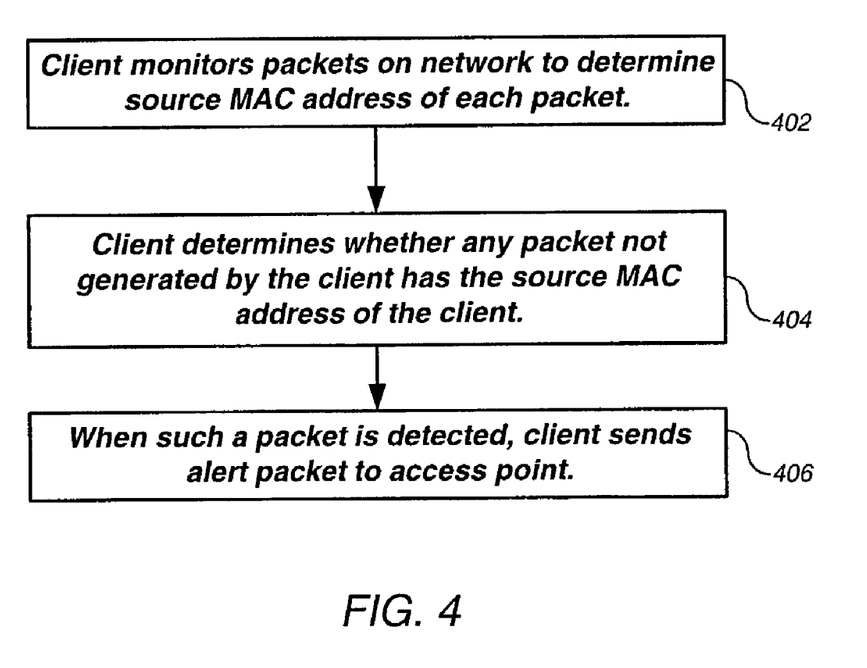
FIG. 4 shows a process performed by a client to detect and report a security breach according to one embodiment.

FIG. 4 shows a process performed by each client 108 to detect and report such a security breach according to one embodiment. For convenience, the process of FIG. 4 is discussed in context of client 108. Client 108 monitors packets on wireless network 102 to determine the source MAC address of each packet (step 402). Client 108 does not detect packets it has transmitted; therefore, any detected packet identifying the MAC address of client 108 as the source MAC address of the packet is a packet sent by an unauthorized user spoofing client 108. When such a packet is detected (step 404), client 108 sends an alert packet to access point 106, which immediately takes appropriate action (step 406). It should be noted that, while this alert process notifies access point 106 of a security breach, it is also open to attack which could result in unauthorized user 104 rendering access point 106 useless. While such an attack cannot compromise security, it can inconvenience the users of access point 106. Techniques that prevent unauthorized user 104 from maliciously transmitting a valid alert packet to access point 106 are discussed below.

In one embodiment, access point 106 responds by immediately removing the MAC address of client 108 from its list of authorized clients, by ceasing to send any packets to the MAC address of client 108, and by discarding all packets that are received from the MAC address of client 108. Then, using the system key, access point 106 restores service to client 108 by granting it a new pairwise key for future communication. Access point 106 then puts the MAC address of client 108 back in the authorized client list.

In the interval between security breach and termination of the attack, unauthorized user 104 can obtain a new pairwise key from authentication server 118. In a conventional network, when the key is transmitted by access point 106, unauthorized user 104 will accept the key, but client 108 will reject the key because it is not expecting a new key. In one embodiment of the present invention, when a client 108 receives a new pairwise key that it has not requested, it will send an alert packet to access point 106.

In another embodiment, client 108 will reject the key because it is unexpected. Access point 106 will now deny service to client 108 because client 108 is using an old key. However, access point 106 recognizes an alert packet as an indication of a security breach when an unencrypted alert indicator is present in the alert packet regardless of the key used to encrypt the payload of the packet. In one embodiment the unencrypted alert indicator is found in the packet type field of the packet. The indicator can be a predetermined packet type, or a packet type that is not expected by access point 106, and therefore generates an error at the access point.

In another embodiment, client 108 encrypts the alert packet with a predetermined key other than the current key (that is, the key stolen by unauthorized user 104). Access point 106 recognizes the alert packet as an indication of a security breach on successfully decrypting the alert packet using the predetermined key. In one embodiment the predetermined key is the system key, which is common to access point 106 and all of the clients 108. In another embodiment, the predetermined key is a previous pairwise key that authentication server 118 provided to client 108 before the current pairwise key. In another embodiment, the predetermined key is a special alert key provided to all of the clients 108 in wireless network 102 for the purpose of encrypting alert packets.

Figure 5:
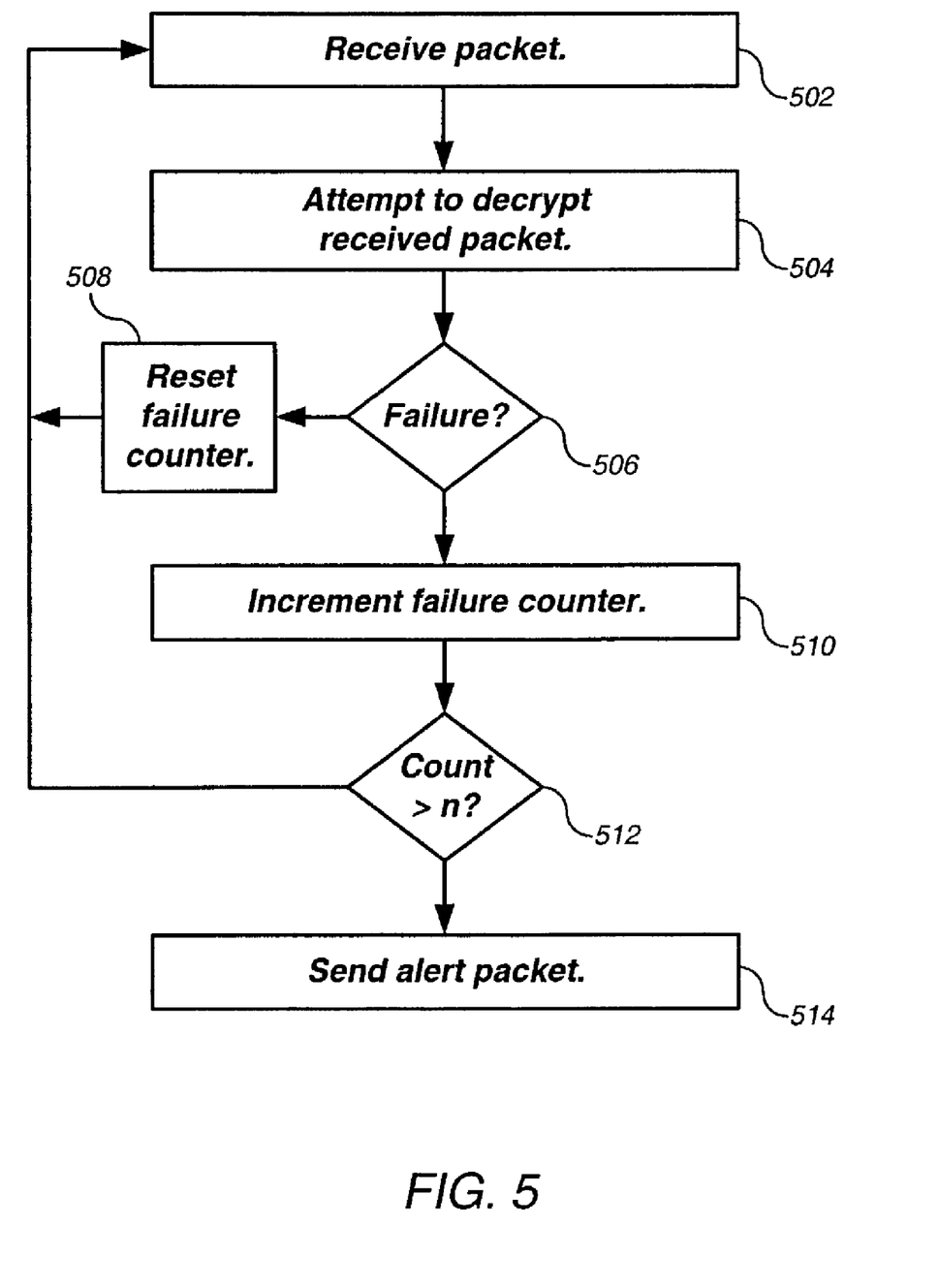
FIG. 5 shows a process performed by a client to detect and report a security breach according to another embodiment.

FIG. 5 shows a process performed by each client 108 to detect and report such a security breach according to another embodiment. For convenience, the process of FIG. 5 is discussed in context of client 108. Client 108 receives packets over the wireless network (step 502), and attempts to decrypt each received packet (step 504). Client 108 determines whether decrypting was a success or a failure for each of the packets (step 506). Client 108 includes an encryption failure counter. Each time client 108 successfully decrypts a packet, the encryption failure counter is reset to zero (step 508). Each time client 108 fails to successfully decrypt a packet, the encryption failure counter is incremented (step 510). When the encryption failure counter reaches a predetermined threshold n (that is, when n consecutive failures have occurred) (step 512), client 108 sends an alert packet to access point 106 (step 514) according to any of the methods described above.

While the above embodiments are described in terms of an infrastructure wireless network, they are also applicable in an ad hoc or peer-to-peer network with only minor modifications. In an ad hoc network, there is no dedicated access point. Instead, one of the clients acts as a conduit for traffic between other clients. Further, there is no authentication server to generate pairwise keys. Instead, the client acting as a conduit generates pairwise keys, and distributes a different pairwise key to each client. When a client detects a security breach, that client sends an alert packet to the client acting as a conduit according to the methods described above. The client acting as a conduit responds according to the methods described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. List any additional modifications or variations. Accordingly, other implementations are within the scope of the following claims.

What is claimed is:

1. A method for detecting a security breach in a network comprising an access point and a plurality of transceivers each having a different media access control address, the method comprising:
   at one of the transceivers,
      receiving a signal from the access point, the signal representing one or more packets of data;
      determining a source media access control address for each of the packets; and
      transmitting an alert packet to the access point when the source media access control address of one of the packets is the media access control address of the transceiver.

2. The method of claim 1, wherein the network is a wireless network.

3. The method of claim 2, wherein the transceiver encrypts packets using a current key before transmitting the packets to the access point, further comprising:
   before transmitting the alert packet to the access point, encrypting a payload portion of the alert packet using a predetermined key other than the current key.

4. The method of claim 3, wherein the access point recognizes the alert packet as an indication of a security breach in the network on successfully decrypting the alert packet using the predetermined key.

5. The method of claim 4, wherein the network further comprises an authentication server, and wherein the predetermined key is selected from the group comprising:
   a system key common to the access point and all of the transceivers in the network;
   a previous key provided by the authentication server to the transceiver before the current key was provided; and
   an alert key provided to all of the transceivers in the network for the purpose of encrypting the alert packets.

6. The method of claim 1, wherein the alert packet comprises an unencrypted alert indicator, and wherein the access point recognizes the alert packet as an indication of a security breach in the network by the presence of the unencrypted alert indicator in the alert packet regardless of the key used to encrypt the alert packet.

7. The method of claim 6, wherein the unencrypted alert indicator is selected from the group comprising:
   a predetermined packet type; and
   a packet type that generates an error at the access point.

8. An apparatus for detecting a security breach in a network comprising an access point and a plurality of transceivers each having a different media access control address, the apparatus comprising:
   a receiver to receive a signal from the access point, the signal representing one or more packets of data;
   a processor to determine a source media access control address for each of the packets; and
   a transmitter to transmit an alert packet to the access point when the source media access control address of one of the packets is the media access control address of the transmitter and receiver.

9. The apparatus of claim 8, wherein the network is a wireless network.

10. The apparatus of claim 9, wherein
   the processor encrypts packets using a current key before the transmitter transmits the packets to the access point; and
   before the transmitter transmits the alert packet to the access point, the processor encrypts a payload portion of the alert packet using a predetermined key other than the current key.

11. The apparatus of claim 10, wherein the access point recognizes the alert packet as an indication of a security breach in the network on successfully decrypting the alert packet using the predetermined key.

12. The apparatus of claim 11, wherein the network further comprises an authentication server, and wherein the predetermined key is selected from the group comprising:
   a system key common to the access point and all of the transceiver in the network;
   a previous key provided by the authentication server to the transceiver before the current key was provided; and an alert key provided to all of the transceivers in the network for the purpose of encrypting the alert packets.

13. The apparatus of claim 8, wherein the alert packet comprises an unencrypted alert indicator, and wherein the access point recognizes the alert packet as an indication of a security breach in the network by the presence of the unencrypted alert indicator in the alert packet regardless of the key used to encrypt the alert packet.

14. The apparatus of claim 13, wherein the unencrypted alert indicator is selected from the group comprising:
a predetermined packet type; and
a packet type that generates an error at the access point.

15. An apparatus for detecting a security breach in a network comprising an access point and a plurality of transceivers each having a different media access control address, the apparatus comprising:
receiver means for receiving a signal from the access point, the signal representing one or more packets of data;
processor means for determining a source media access control address for each of the packets; and
transmitter means for transmitting an alert packet to the access point when the source media access control address of one of the packets is the media access control address of the transmitter and receiver means.

16. The apparatus of claim 15, wherein the network is a wireless network.

17. The apparatus of claim 16, wherein:
the processor means encrypts packets using a current key before the transmitter means transmits the packets to the access point; and
before the transmitter means transmits the alert packet to the access point, the processor means encrypts a payload portion of the alert packet using a predetermined key other than the current key.

18. The apparatus of claim 17, wherein the access point recognizes the alert packet as an indication of a security breach in the network on successfully decrypting the alert packet using the predetermined key.

19. The apparatus of claim 18, wherein the network further comprises an authentication server, and wherein the predetermined key is selected from the group comprising:
a system key common to the access point and all of the transceivers in the network;
a previous key provided by the authentication server to the transceiver before the current key was provided; and
an alert key provided to all of the transceivers in the network for the purpose of encrypting the alert packets.

20. The apparatus of claim 15, wherein the alert packet comprises an unencrypted alert indicator, and wherein the access point recognizes the alert packet as an indication of a security breach in the network by the presence of the unencrypted alert indicator in the alert packet regardless of the key used to encrypt the alert packet.

21. The apparatus of claim 20, wherein the unencrypted alert indicator is selected from the group comprising:
a predetermined packet type; and
a packet type that generates an error at the access point.

22. Computer-readable media embodying instructions executable by a computer to perform a method for detecting a security breach in a network comprising an access point and a plurality of transceivers each having a different media access control address, the method comprising:
at one of the transceivers,
receiving a signal from the access point, the signal representing one or more packets of data;
determining a source media access control address for each of the packets; and
transmitting an alert packet to the access point when the source media access control address of one of the packets is the media access control address of the transceiver.

23. The media of claim 22, wherein the network is a wireless network.

24. The media of claim 23, wherein the transceiver encrypts packets using a current key before transmitting the packets to the access point, and wherein the method further comprises:
before transmitting the alert packet to the access point, encrypting a payload portion of the alert packet using a predetermined key other than the current key.

25. The media of claim 24, wherein the access point recognizes the alert packet as an indication of a security breach in the network on successfully decrypting the alert packet using the predetermined key.

26. The media of claim 25, wherein the network further comprises an authentication server, and wherein the predetermined key is selected from the group comprising:
a system key common to the access point and all of the transceivers in the network;
a previous key provided by the authentication server to the transceiver before the current key was provided; and
an alert key provided to all of the transceivers in the network for the purpose of encrypting the alert packets.

27. The media of claim 22, wherein the alert packet comprises an unencrypted alert indicator, and wherein the access point recognizes the alert packet as an indication of a security breach in the network by the presence of the unencrypted alert indicator in the alert packet regardless of the key used to encrypt the alert packet.

28. The media of claim 27, wherein the unencrypted alert indicator is selected from the group comprising:
a predetermined packet type; and
a packet type that generates an error at the access point.

29. A transceiver for detecting a security breach in a network comprising a plurality of the transceivers each having a different media access control address, the plurality of the transceivers including a conduit transceiver acting as a conduit for traffic among the other transceivers, the transceiver comprising:
a receiver to receive a signal from the conduit transceiver, the signal representing packets of data;
a processor to determine a source media access control address for each of the packets; and
a transmitter to transmit an alert packet to the conduit transceiver when the source media access control address of one of the packets is the media access control address of the transceiver.

30. The transceiver of claim 29, wherein the network is a wireless network.

31. The transceiver of claim 30, wherein the processor encrypts packets using a current key before the transmitter transmits the packets to the conduit transceiver; and
the processor encrypts a payload portion of the alert packet using a predetermined key other than the current key before the transmitter transmits the alert packet to the conduit transceiver.

32. The transceiver of claim 31, wherein the conduit transceiver recognizes the alert packet as an indication of a security breach in the network on successfully decrypting the alert packet using the predetermined key.

33. The transceiver of claim 32, wherein the predetermined key is selected from the group comprising:
- a system key common to all of the transceivers in the network;
- a previous key provided by the conduit transceiver to the transceiver before the current key was provided; and
- an alert key provided by the conduit transceiver for the purpose of encrypting the alert packets.

34. The transceiver of claim 30, wherein the alert packet comprises an unencrypted alert indicator, and wherein the conduit transceiver recognizes the alert packet as an indication of a security breach in the network by the presence of the unencrypted alert indicator in the alert packet regardless of the key used to encrypt the alert packet.

35. The transceiver of claim 34, wherein the unencrypted alert indicator is selected from the group comprising:
- a predetermined packet type; and
- a packet type that generates an error at the conduit transceiver.

36. A transceiver for detecting a security breach in a network comprising a plurality of the transceivers each having a different media access control address, the plurality of the transceivers including a conduit transceiver acting as a conduit for traffic among the other transceivers, the transceiver comprising:
- receiver means for receiving a signal from the conduit transceiver, the signal representing packets of data;
- processor means for determining a source media access control address for each of the packets; and
- transmitter means for transmitting an alert packet to the conduit transceiver when the source media access control address of one of the packets is the media access control address of the transceiver.

37. The transceiver of claim 36, wherein the network is a wireless network.

38. The transceiver of claim 37, wherein:
- the processor means encrypts packets using a current key before the transmitter means transmits the packets to the conduit transceiver; and
- the processor means encrypts a payload portion of the alert packet using a predetermined key other than the current key before the transmitter means transmits the alert packet to the conduit transceiver.

39. The transceiver of claim 38, wherein the conduit transceiver recognizes the alert packet as an indication of a security breach in the network on successfully decrypting the alert packet using the predetermined key.

40. The transceiver of claim 39, wherein the predetermined key is selected from the group comprising:
- a system key common to all of the transceivers in the network;
- a previous key provided by the conduit transceiver to the transceiver before the current key was provided; and
- an alert key provided by the conduit transceiver for the purpose of encrypting the alert packets.

41. The transceiver of claim 37, wherein the alert packet comprises an unencrypted alert indicator, and wherein the conduit transceiver recognizes the alert packet as an indication of a security breach in the network by the presence of the unencrypted alert indicator in the alert packet regardless of the key used to encrypt the alert packet.

42. The transceiver of claim 41, wherein the unencrypted alert indicator is selected from the group comprising:
- a predetermined packet type; and
- a packet type that generates an error at the conduit transceiver.

43. Computer-readable media embodying instructions executable by a computer to perform a method for detecting a security breach in a network comprising a plurality of transceivers each having a different media access control address, the plurality of transceivers including first and second transceivers, the first transceiver acting as a conduit for traffic among the other transceivers, the method comprising:
- at the second transceiver,
  - receiving a signal from the first transceiver, the signal representing packets of data,
  - determining a source media access control address for each of the packets; and
  - transmitting an alert packet to the first transceiver when the source media access control address of one of the packets is the media access control address of the second transceiver.

44. The media of claim 43, wherein the network is a wireless network.

45. The media of claim 44, wherein the second transceiver encrypts packets using a current key before transmitting the packets to the first transceiver, and the method further comprises:
- before transmitting the alert packet to the first transceiver, encrypting a payload portion of the alert packet using a predetermined key other than the current key.

46. The media of claim 45, wherein the first transceiver recognizes the alert packet as an indication of a security breach in the network on successfully decrypting the alert packet using the predetermined key.

47. The media of claim 46, wherein the predetermined key is selected from the group comprising:
- a system key common to all of the transceivers in the network;
- a previous key provided by the first transceiver to the second transceiver before the current key was provided; and
- an alert key provided by the first transceiver for the purpose of encrypting the alert packets.

48. The media of claim 44, wherein the alert packet comprises an unencrypted alert indicator, and wherein the first transceiver recognizes the alert packet as an indication of a security breach in the network by the presence of the unencrypted alert indicator in the alert packet regardless of the key used to encrypt the alert packet.

49. The media of claim 48, wherein the unencrypted alert indicator is selected from the group comprising:
- a predetermined packet type; and
- a packet type that generates an error at the first transceiver.

* * * * *

UNITED STATES PATENT AND TRADEMARK OFFICE
CERTIFICATE OF CORRECTION

PATENT NO. : 7,293,289 B1 Page 1 of 1
APPLICATION NO. : 10/242135
DATED : November 6, 2007
INVENTOR(S) : Peter Loc et al.

It is certified that error appears in the above-identified patent and that said Letters Patent is hereby corrected as shown below:

Column 3, Line 9    Delete "The" and insert -- the --
Column 5, Line 12   Delete the quote mark after "client)."
Column 5, Line 19   Delete "an" after "based" and insert -- on --

Signed and Sealed this

Twenty-ninth Day of April, 2008

JON W. DUDAS
*Director of the United States Patent and Trademark Office*